UNITED STATES PATENT OFFICE.

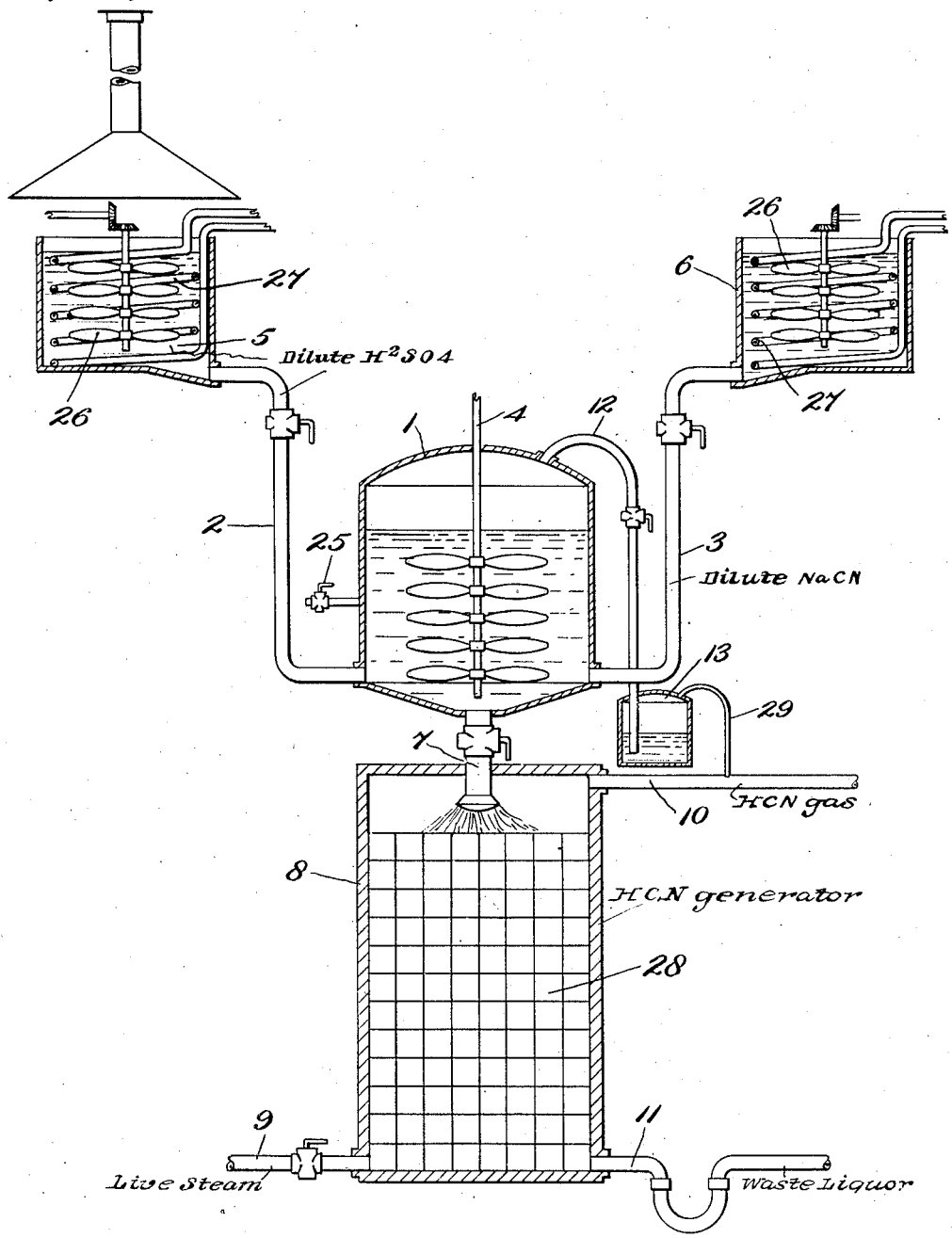

GUY H. BUCHANAN, OF ROSELLE, NEW JERSEY, ASSIGNOR TO AMERICAN CYANAMID COMPANY, OF NEW YORK, N. Y., A CORPORATION OF MAINE.

METHOD OF PRODUCING HYDROCYANIC ACID.

1,352,655.  Specification of Letters Patent.  Patented Sept. 14, 1920.

Application filed November 12, 1919. Serial No. 337,468.

*To all whom it may concern:*

Be it known that I, GUY H. BUCHANAN, a citizen of the United States, residing at Roselle, in the county of Union and State of New Jersey, have invented certain new and useful Improvements in Methods of Producing Hydrocyanic Acid; and I do hereby declare the following to be a full, clear, and exact description of the invention, such as will enable others skilled in the art to which it appertains to make and use the same.

This invention relates to a process of recovering high grade hydrocyanic acid from a crude form of cyanid, and has for its object to provide a method of obtaining such high grade products from low grade raw materials which will be more efficient and less costly than those heretofore proposed.

With these and other objects in view the invention consists in the novel steps and combinations of steps constituting the process, all as will be more fully hereinafter disclosed and particularly pointed out in the claims.

The figure of the accompanying drawing, forming a part of this specification, is a diagrammatic illustration of one form of apparatus suitable for carrying out this process.

In order that the precise nature of this invention may be the more clearly understood it is said: It is well known in the art that when the ordinary sodium or potassium cyanid of commerce, containing say 96 to 98% of the corresponding cyanid, is treated with a strong mineral acid, hydrocyanic acid is evolved and a corresponding sodium or potassium salt of the mineral acid used is left behind in the residue. For instance, in the case of sodium cyanid and sulfuric acid, the reaction takes place according to the well known equation:—

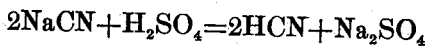

$$2NaCN + H_2SO_4 = 2HCN + Na_2SO_4$$

This reaction has heretofore been used on a large scale for the production of hydrocyanic acid, by a method involving the running of a small amount of water into a generator, and then adding 66° acid in quantities equivalent to the sodium cyanid to be charged. The purpose of the water was largely to heat up the acid to a high temperature. Pure sodium cyanid was by this method dissolved in water in the proportions of one part of cyanid to two parts of water and this solution was run into the acid fairly rapidly. The hydrocyanic acid gas was evolved rapidly and at the close of the operation the contents of the generator were discharged. This procedure showed a consecutive recovery over many months operation of around 80% of the theoretical quantity of hydrocyanic acid to be expected from the cyanid. The residue was highly acid and smelled strongly of hydrocyanic acid gas.

In carrying out the process of my Patent #1317755, on the other hand, I was confronted with the problem of using a new form of cyanid which contained approximately 19% of cyanogen equivalent to 35% of sodium cyanid, about 40% of calcium chlorid, about 5% of sodium chlorid, about 15% of lime and 5% of miscellaneous impurities which play no essential part in the operation. In attempting to utilize this crude material in the same manner as pure cyanid, I ran into the difficulty of being unable to make a solution of this said impure cyanid of the same strength as that used with the pure material. Further, this extremely strong solution heated up to such a high degree in its making that it was very unstable.

I therefore was forced to change the process employing a pure cyanid, when it came to operating under my said patent for I found it necessary to charge the generator with water, then add the crude flake cyanid and finally to introduce sulfuric acid of 60° strength under the surface of the liquid, instead of an acid of 66° strength.

In this latter method I was enabled to utilize the crude cyanid in a fairly satisfactory manner, obtaining on large scale work and over a large period of time, recoveries as high as 85% of the theoretical, and in experimental work under careful control of recoveries of between 90 and 95%. I, however, found that to obtain the most satisfactory results with my patented method, I was practically limited to the use of 60° sulfuric acid, as the introduction of a stronger acid into the crude flake cyanid resulted in a lower efficiency as well as in a more difficult operation.

The introduction of a 60° or of a stronger acid to the generator seems to cause a decomposition of either the sodium cyanid present, or of the evolved hydrocyanic acid with the resulting lowering of the efficiency. In a copending application, entitled Process of recovering hydrocyanic acid Sr. No. 337469 filed November 12, 1919, I have modified my said earlier procedure to make first a dilute solution of the crude cyanid which I mix with a dilute solution of sulfuric acid. This mixing may be done in a generator, thereby evolving only a small proportion of the hydrocyanic acid during the mixing of the two solutions, and I finish the evolution of hydrocyanic acid in the process of my said copending application by heating up the contents of the generator. In this said last mentioned process, I avoid the evolution of hydrochloric acid even though sulfuric acid is present in excess during a portion of the mixing.

I have observed in practice that by using an extreme dilution of a cyanid solution in the proportion of, for example, one part of crude cyanid to five or six parts of water, by treating this with a dilute solution of sulfuric acid running only say 15 to 30 or 35% acid and by maintaining the sulfuric acid in slight excess so that after the mixing and the reaction, my final solution contains several per cent. of free sulfuric acid, I evolve essentially no hydrocyanic acid during the mixing. If now, I heat the mixture in the generator to a high temperature, I obtain a quantity of hydrocyanic acid gas practically equivalent to the pure cyanid present in the crude cyanid.

In other words, I have found that this method can even be utilized as a means of analytical procedure for determining the amount of equivalent hydrocyanic acid that should be evolved respectively, from the pure sodium, or other pure cyanid that is present, in the crude cyanid being operated upon.

I have further been enabled to carry out this said procedure on a large scale, using an entirely different type of apparatus for the generation of the desired hydrocyanic acid than those heretofore proposed, and at the same time produce a very much larger yield of hydrocyanic acid than heretofore. In fact, this yield is almost perfect.

In my new process, made the subject of this application, I prepare with agitation, a cold dilute solution of crude cyanid by mixing one part of crude cyanid to five or six parts of water.

To this solution I add a cold solution containing say between 15% and 30% of sulfuric acid in a suitable acid proof tank using such quantities of this sulfuric acid solution that after mixing, I have two or three per cent. free sulfuric acid remaining after satisfying the requirements of the crude cyanid in neutralizing the calcium salts and decomposing the contained cyanid.

I now run this slurry down over a tall tower of acid proof construction in the base of which I supply heat, preferably in the form of live steam. This steam heats up the slurry as it runs down over the tower and evolves hydrocyanic acid. By suitably regulating the flow of slurry and the addition of steam, I obtain a very strong hydrocyanic acid gas which I treat through suitable condensers and scrubbing equipment and recover the hydrocyanic acid in substantially an anhydrous form.

Referring to the accompanying drawing 1 represents a mixer consisting of a closed apparatus provided with valved inlet tubes 2, and 3 respectively, for introducing separately dilute solutions of sulfuric acid and sodium cyanid. This mixer contains an agitator 4 and is provided with a sampling valve 25 by means of which the acidity of the mingled solutions in the mixer may be properly ascertained. The predissolving, the dilution and the cooling of respectively the sulfuric acid and sodium cyanid take place in the mixers 5 and 6, each of which is provided with agitators, 26, and with cooling coils 27, for thoroughly chilling the solutions. The main mixer 1 discharges through the outlet 7 into the top of a generator or distilling column 8, and the liquid is distributed over the top of a system of checker work 28, and trickles down through the same. In passing down through the checker work 28, the liquid comes in contact with live steam which is introduced at the inlet 9, and the evolved hydrocyanic acid gas is led off through the outlet 10, to a suitable purifying, condensing and storing apparatus. The waste liquor from the tower 8 flows off at outlet 11.

In mixer 1 very little gas is evolved because of the low temperature of the mingled solutions, but whatever hydrocyanic acid gas is there evolved can be discharged into the main outlet pipe 10 by way of the outlet 12, from the mixer 1 through the liquid sealing apparatus 13, and through pipe 29.

It is self evident that in an apparatus of this kind, employing a counter current of acid and cyanid solutions against a source of steam or other heating fluid, I can use as an evolution tower, an apparatus of such a design that by supplying cold liquor at the top and a source of heat at the bottom, it will operate as a rectifying column and enable me to produce a concentrated hydrocyanic acid in one operation.

It is self evident that those skilled in the art may vary the details of the above procedure and construction without departing from the spirit of my invention, and I therefore, do not wish to be limited to the above disclosure except as may be required by the claims.

What I claim is:—

1. The process of producing hydrocyanic acid from a crude cyanid containing substantial quantities of calcium chlorid, lime, and sodium chlorid which consists in preparing a mixture of refrigerated dilute solutions containing a mineral acid and said crude cyanid, there being more than sufficient acid present to react with all the impurities; and passing said mixture in countercurrent against a source of heat whereby the gas dissolved in said solution is driven off; and suitably recovering said evolved gas, substantially as described.

2. The process of producing hydrocyanic acid from crude cyanids containing substantially 40% calcium chlorid, 15% lime, and substantial percentages of other impurities which consists in making a dilute refrigerated solution of said cyanid and a dilute refrigerated solution of sulfuric acid, there being present more than enough acid to react with all the impurities; mixing said dilute solutions at moderate temperatures; subjecting the mixture thus produced to the action of heat to evolve hydrocyanic acid from said mixture; and suitably recovering said evolved acid, substantially as described.

3. The process of producing hydrocyanic acid from crude cyanids containing substantial percentages of impurities which consists in mixing a cold dilute solution of said cyanid with a cold dilute solution of sulfuric acid containing between 15% and 30% of sulfuric acid in such proportions that the resulting solution will contain a slight excess of sulfuric acid; then progressively subjecting said mixed solutions to the action of steam for the purpose of raising the temperature and evolving said hydrocyanic acid; and suitably recovering said evolved gas, substantially as described.

4. The process of producing hydrocyanic acid from crude cyanids containing substantial percentages of calcium chlorid, lime, sodium chlorid and other impurities which consists in heating a previously cooled mixture formed of a dilute solution of said cyanid and a dilute solution of sulfuric acid containing less than 35% acid; passing said mixed solutions in a countercurrent against a heating fluid for the purpose of driving off said dissolved hydrocyanic acid; and recovering said hydrocyanic acid, substantially as described.

5. The process of producing hydrocyanic acid from crude cyanids containing substantial percentages of calcium chlorid, lime and other impurities which consists in preparing a relatively cold mixture of dilute solutions of said cyanid and a mineral acid, said mixture containing a slight excess of sulfuric acid; passing said mixture in thin layers as a counter current against a current of steam, and recovering the hydrocyanic gas thus evolved, substantially as described.

In testimony whereof I affix my signature.

GUY H. BUCHANAN.